Patented Dec. 15, 1931

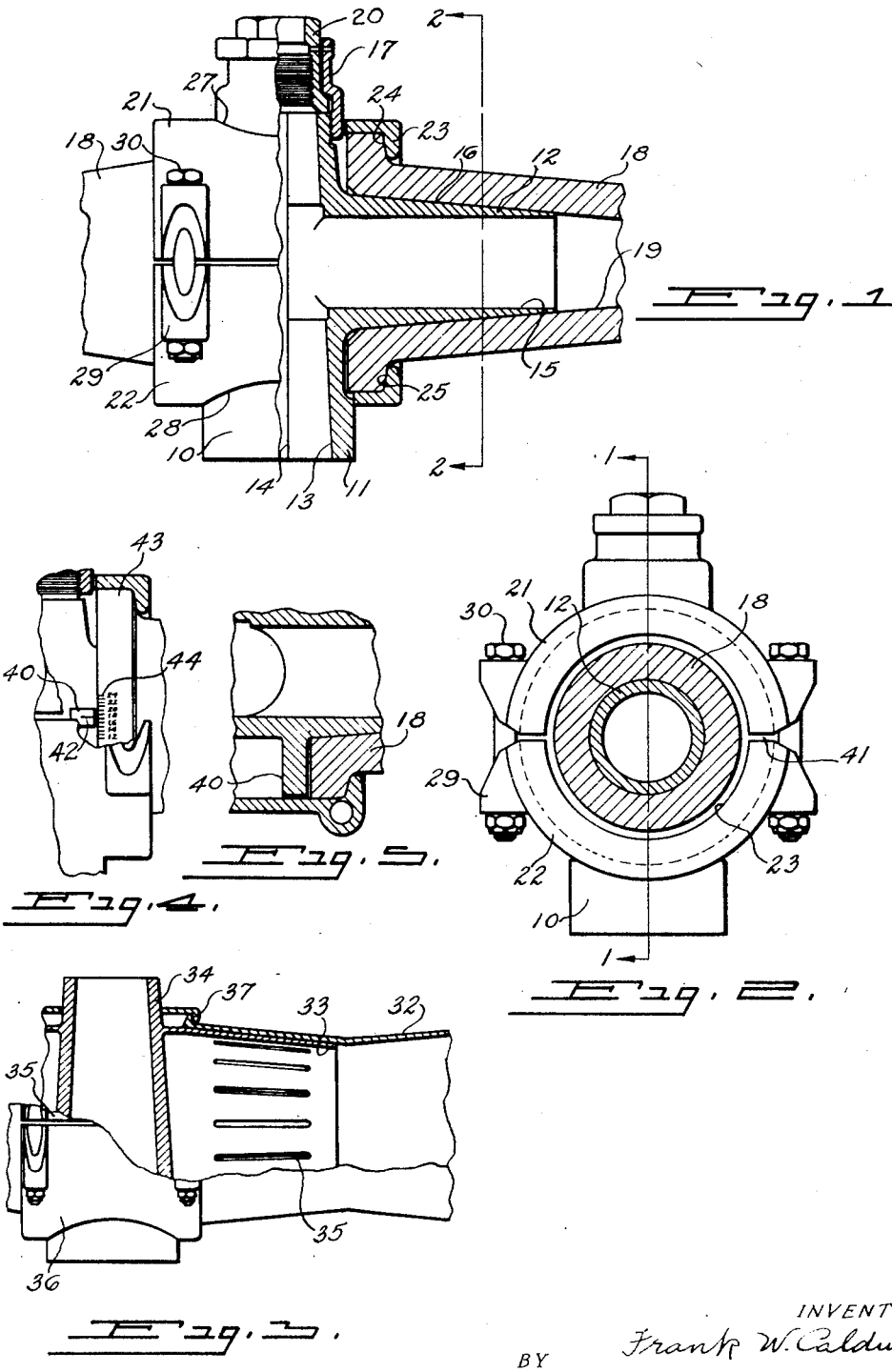

1,836,700

UNITED STATES PATENT OFFICE

FRANK W. CALDWELL, OF DAYTON, OHIO, ASSIGNOR TO THE HAMILTON STANDARD PROPELLER CORPORATION, A CORPORATION OF PENNSYLVANIA

PROPELLER

Application filed September 11, 1928. Serial No. 305,252.

This invention relates to propellers and is particularly adapted to propellers having a plurality of blades which are connected to a hub portion.

One object of the invention is the provision of a propeller of this character having a hub portion in wedging connection with the blades, the blades being retained against the action of the centrifugal force independently of the means by which the blades are rotationally driven.

Another object of the invention is the provision of a metal propeller of this character having hollow hub projections slotted inwardly of the ends of the projections to provide slight resiliency to the projections by which the blades are driven.

Another object of the invention is the provision of a propeller of this character having a novel means for indicating the angular setting of the blade.

Other objects and advantages of the invention will be apparent from the following description and accompanying drawings in which Fig. 1 is a side elevation, shown partly in central section, of a central portion of a propeller embodying the present invention;

Fig. 2 is a section on the line 2—2 of Fig. 1;

Fig. 3 is a view of a modified form of construction shown partly in central section; and Figs. 4 and 5 are detailed views of another modified form of construction showing the angle indicating means.

Referring more particularly to the drawings by reference and with particular reference to Figs. 1 and 2, the hub portion 10 of the propeller comprises the axle portion 11 and the integral radially extending projections 12 which extend laterally away from the axle portion 11. The portions 11 and 12 of the hub are preferably in the form of a steel drop-forging, the axle portion having, for example, an internal tapered hole 13 provided with a keyway 14 by means of which the propeller hub is mounted on a suitable propeller shaft, not shown. The projections 12 are preferably hollow, being shown as provided with an internal cylindrical bore 15, these hub projections tapering outwardly in cross sectional dimensions by reason of their outwardly tapered or frusto-conical surfaces 16. One end of the propeller hub may be provided with a suitable cap 17 by which it may be pulled loose from the drive shaft, this cap also serving to retain the retaining nut 20 which screws on the end of the drive shaft to mount the hub in place, parts 17 and 20 being fastened together by cotter pins or the like so the retaining nut will not be accidentally backed off.

The invention as herein disclosed embodies a two-blade propeller especially adapted for aircraft use, although it should be understood that the invention is susceptible of other modifications and uses. As herein disclosed, on each of the hub projections 12 is a propeller blade 18, preferably of metal construction. The blades 18 may be made of suitable aluminum or magnesium aluminum alloy forgings, and their root portions are hollow and provided with frusto-conical surface 19 which correspond in taper to the surfaces 16 of the hub projections, so that the blades may be wedged on the projections by inward movement of the blades toward the hub. The root portions of the blades directly engage the hub projections throughout substantially the entire length of the latter, so that the hub projections transmit practically the entire rotational thrust force to the blade without materially restraining the blades against centrifugal force.

The blades are retained on the hub and held against centrifugal forces by means of the two split clamp parts 21 and 22 each of which are substantially of semicylindrical construction, having in-turned flanged edges 23 on which are frusto-conical wedge surfaces 24 which engage the flanged inner ends of the blade roots, as shown. The inner ends of the blade roots are provided with short frusto-conical surfaces 25, which taper about several thousandths of an inch from one end to the other, these surfaces thus sloping slightly toward the propeller axis away from the blade axes. The two clamp parts 21 and 22 are centrally provided with openings 27 and 28 respectively through which the axle portion 11 of the hub extends, the opening or cut-away portion 28 being preferably of such size as to fit snugly on the adjacent end of the axle portion 11 of the hub, while the opening 27 is preferably slightly larger than the portion of the hub it surrounds. Clamp lugs 29 are provided on the clamp parts 21 and 22 so that the two clamp parts may be attached together, and moved slightly in the direction of the propeller axis when the blades are being fixed to the propeller hub by means of clamp bolts 30 which extend through suitable holes in these clamp lugs. Thus when the clamp bolts 30 are tightened, the two clamp parts are drawn together, the tapered surfaces 24 and 25 providing for a slight inward movement of the blades toward the propeller axis which serves to draw the inner ends of the blades in tight wedging engagement with the outer tapered surfaces of the hub projections 12, so that they are thus held rigidly on these hub projections. It has been found that the assembly of the blades on the hub projections may be very conveniently effected by dipping the root ends of the blades into hot water so that they are slightly expanded just before the blades are applied to the hub projections 12, and the subsequent clamping action of the split clamp parts 21 and 22 may then be easily accomplished and the blades firmly mounted in position. In this way a very firm engagement of the blades and the hub projections is obtained, even though the surfaces 16 and 19 are cylindrically formed instead of tapered. The clamp parts 21 and 22 form practically the sole restraining means holding the blades against centrifugal force and attaching them to each other and to the propeller hub, these clamp parts being substantially ineffective in the transmission of rotational thrust force to the blades. Such a construction permits the centrifugal force strains and the rotational thrust force strains to be independently taken, and the various parts of the propellers may thus be accurately designed and produce a very light construction in which the blades and hub are tightly assembled.

The blades may be made of sheet metal if desired, and in Fig. 3 is shown a modification of the invention in which the blades 32 are of suitable sheet metal, such as sheet steel, these blades being engaged at their inner ends by the hub projections 33 of hub 34 which is constructed generally similar to the hub shown in Fig. 1. However, where blades of this character are employed, it has been found desirable to slot the hub projections 33, preferably longitudinally, in such a way that the slots do not extend to the outer ends of these projections. These slots 35 in the hub projections, while permitting firm wedging engagement of the inner ends of the blades throughout substantially the entire length of the hub projections, give some degree of flexibility to the hub projections at points inwardly of their ends. Strains and stresses in the inner ends of the blades are not concentrated at any one point, it being noted that the flexibility of the hub projections is provided at a comparatively wide region between the inner ends of the blades and the outer ends of the hub projections. The blades are retained on the tapered hub projections 33 in the same manner as in the construction shown in Figs. 1 and 2, by means of split clamp parts 35 and 36 which engage the slightly tapered surfaces 37 provided on the inner ends of the blades.

To indicate the angular setting of the propeller blades, adjustment of which is of course permitted on the hub by reason of the manner in which the blades are attached, as shown in Figs. 4 and 5 the hub may be provided integrally with a lug 40 projecting toward the space 41 between the adjacent edges of the split clamp parts. This lug is provided with a reference line 42 which is apparent to an observer through the space 41, and the peripheral cylindrical surface 43 of the propeller blade end is provided with a series of lines 44 opposite which are numbers which indicate the angular setting of the propeller blade corresponding to the particular lines on this blade surface. By noting which of the lines 44 is opposite the reference line 42 the angular setting of the blade is determined. The provision of these lines 44 on the outer side of the propeller blade flange provides for an open scale, and the provision of lug 40 as an integral part of the propeller hub insures the permanent relation of the reference line 42 with relation to the hub as an entirety so that accurate setting of the blade angles may be apparent to one checking or adjusting the blade settings of the propeller.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A propeller comprising a hub having blade engaging portions, blades having their inner ends engaged with said portions, said blades and portions having engaging surfaces tapered in the direction of the blade length so that the blades are wedged onto said portions by movement of the blades toward the hub axis, and means engaging the inner ends of said blades for attaching the blades together independently of the hub and restraining their outward movement with relation to the hub.

2. A propeller comprising a hub having blade engaging portions, blades having their inner ends engaged with said portions, said blades and portions having engaging surfaces tapered in the direction of the blade length so that the blades are wedged onto said portions by inward movement of the blades, and means in wedging engagement with said blades for attaching the blades together and restraining their outward movement with relation to the hub.

3. A propeller comprising a hub having blade engaging portions, blades having their inner ends engaged with said portions, said blades and portions having engaging surfaces tapered in the direction of the blade length so that the blades are wedged onto said portions by inward movement of the blades, and means movable axially of the propeller in wedging engagement with the inner ends of said blades for attaching said blades together and restraining their outward movement with relation to the hub independently of the blade engaging portions of the hub.

4. A propeller comprising a hub having blade engaging projections, blades having their inner ends enclosing said projections and in wedging engagement therewith throughout substantially the length of said projections so that the blades are wedged thereon by inward movement of the blades toward the hub axis, and a pair of complementary blade clamps independent of said hub projections movable axially of the propeller to engage the inner ends of said blades and restrain their outward movement.

5. An airplane propeller comprising a pair of blades having hollow root portions, a hub having means engaging the inner sides of the root portions of both of the blades for transmitting substantially all rotational thrust force to the blades, said means having a wedge surface tapered in the direction of the blade length, the inner side of the root portion of a blade being correspondingly tapered so that the blade is wedged on the projection by inward movement of the blade, and means engaging the outer side of the root portion of the blade for holding the blades together independently of said hub and restraining said blades substantially against the entire centrifugal force.

6. An airplane propeller comprising a pair of blades having hollow root portions, a hub having means engaging the inner sides of the root portions of the blades for transmitting substantially all rotational thrust force to the blades, said means having a tapered wedge surface, the inner side of the root portion of a blade being correspondingly tapered so that the blade is wedged on the projection by inward movement of the blade, and means engaging the outer side of the root portion of the blade for holding the blade to the hub independently of said hub projections and restraining said blades substantially against the entire centrifugal force, said means being movable axially of the hub and in wedging engagement with the inner ends of said blades.

7. A propeller comprising a hub having hollow blade engaging projections, said projections being longitudinally slotted intermediate their ends, blades having hollow root portions engaged with said projections, and means interconnecting said blades to retain them against the action of centrifugal force independently of said projections.

8. A propeller comprising a steel hub having integral blade engaging hollow projections, metal blades having their inner ends in tapered socketed connection with said projections, said projections having slots extending to points inwardly of the outer ends of said projections, and means to interconnect said blades and retain them against the action of substantially the entire centrifugal force.

9. A propeller comprising a hub having blade engaging projections, blades having their inner ends engaged with said projections, said blades and projections having engaging tapered surfaces so that the blades are wedged on the projections by inward movement of the blades, means engaging said blades for attaching said blades together and restraining their outward movement in relation with the hub, said hub having an outwardly extending lug extending transversely to said projections, the inner ends of said blades being flanged outwardly and having circumferential surfaces provided with marks cooperating with said lugs to indicate the angle of the setting of the blades.

10. A propeller comprising a hub having blade engaging projections of circular cross section, and blades having their inner ends bored out and engaging with said projections, the blade ends being shrunk on the projections to provide a firm engagement near the inner ends of the blades.

11. A propeller comprising a hub having blade engaging projections, blades having their inner ends bored out and engaging with said projections, the blade ends being shrunk on the projections to provide a firm engagement near the inner ends of the blades and means for fastening said blades together and to the hub.

12. A propeller comprising a hub having blade engaging projections, blades having their inner ends bored out and engaging with said projections, the blade ends being shrunk on the projections to provide a firm engagement near the inner ends of the blades and means engaging the inner ends of said blades for fastening said blades together independently of the hub and restraining their outward movement with relation to the hub, said means being substantially free from strain due to driving forces.

13. A propeller comprising a hub having blade engaging projections, blades having their inner ends engaged with said projections, means engaging said blades for attaching them together and restraining their outward movement with relation to the hub, said hub having outwardly extending reference portions and the inner ends of said blades having an outwardly extending portion adjacent thereto, both said portions being provided with marks to indicate the angle of the setting of the blades, the marks being thus positioned remote from the blade axes.

14. A propeller comprising a hub having blade engaging projections, blades having hollow inner ends enclosing said projections, means directly interconnecting said blades independently of said hub for attaching said blades together and restraining their outward movement with relation to the hub, said hub having outwardly extending reference portions and the inner ends of said blades having an outwardly extending portion adjacent thereto, both said portions being provided with marks to indicate the angle of the setting of the blades, the marks being thus positioned remote from the blade axes.

15. An aircraft propeller comprising a hub having blade engaging portions, blades having inner ends of circular cross-section engaged with said portions, the inner ends of the blades and the blade engaging portions of the hub having engaged surfaces tapered in the direction of the blade length so that the blades are wedged on to said portions at any desired blade angle by movement of the blades toward the hub axis, and means engaging the inner ends of said blades for attaching the blades together independently of the hub and restraining their outward movement with relation to the hub.

In testimony whereof I hereto affix my signature.

FRANK W. CALDWELL.